United States Patent
Xiong et al.

(10) Patent No.: US 10,469,321 B2
(45) Date of Patent: Nov. 5, 2019

(54) CHANNEL CONFIGURATION METHODS AND DEVICES FOR ROBOTS

(71) Applicant: UBTECH Robotics Corp., Shenzhen (CN)

(72) Inventors: Youjun Xiong, Shenzhen (CN); Hailang Zhou, Shenzhen (CN); Musen Zhang, Shenzhen (CN)

(73) Assignee: UBTECH Robotics Corp., Shenzhen (CN)

( * ) Notice: Subject to any disclaimer, the term of this patent is extended or adjusted under 35 U.S.C. 154(b) by 160 days.

(21) Appl. No.: 15/669,963

(22) Filed: Aug. 7, 2017

(65) Prior Publication Data

US 2018/0191575 A1    Jul. 5, 2018

(30) Foreign Application Priority Data

Dec. 30, 2016 (CN) .......................... 2016 1 1269644

(51) Int. Cl.
| | |
|---|---|
| H04L 12/28 | (2006.01) |
| H04L 12/24 | (2006.01) |
| H04L 12/18 | (2006.01) |
| H04L 12/40 | (2006.01) |
| B25J 13/00 | (2006.01) |
| H04L 29/08 | (2006.01) |

(52) U.S. Cl.
CPC ........ *H04L 41/0896* (2013.01); *B25J 13/006* (2013.01); *H04L 12/1868* (2013.01); *H04L 12/40* (2013.01); *H04L 67/12* (2013.01); *H04L 2012/40215* (2013.01)

(58) Field of Classification Search
CPC ................ H04L 12/40; H04L 12/1868; H04L 12/40045; H04L 67/12
See application file for complete search history.

(56) References Cited

U.S. PATENT DOCUMENTS

| | | | |
|---|---|---|---|
| 2006/0023677 A1* | 2/2006 | Labrador ................ H04L 45/42 | 370/338 |
| 2008/0183835 A1* | 7/2008 | Uemura .............. G06F 11/2215 | 709/207 |
| 2016/0078583 A1* | 3/2016 | Nishitani .................. G06T 7/73 | 700/259 |
| 2016/0080168 A1* | 3/2016 | Lieder ............... H04L 12/40032 | 370/468 |
| 2017/0109309 A1* | 4/2017 | van de Burgt ...... G06F 13/4031 | |

* cited by examiner

*Primary Examiner* — Abdelnabi O Musa

(57) ABSTRACT

The present disclosure relates to a channel configuration method for communication between the main controller of the robot and the at least one node of the robot, including: receiving at least one description message transmitted from at least one node via a broadcast channel, confirming a channel according to the description message of the node, wherein a main controller communicates with the node via the channel, and transmitting at least one channel configuration message via the broadcast channel. The channel configuration message carries the description message of the node and a description message of the channel. The main controller may communicate with the node via the channel.

18 Claims, 5 Drawing Sheets

CHANNEL CONFIGURATION METHODS AND DEVICES FOR ROBOTS

CROSS REFERENCE TO RELATED APPLICATIONS

This application claims priority to Chinese Patent Application No. 201611269644.6, filed Dec. 30, 2016, which is hereby incorporated by reference herein in its entirety.

BACKGROUND

1. Technical Field

The present disclosure relates to communication field, and more particularly to a channel configuration method for communication between a main controller of a robot and at least one node of the robot and a device for controlling robots.

2. Description of Related Art

Controller Area Network (CAN) bus is a serial communication protocol for real-time applications, and is a point-to-multipoint mechanism. The CAN has been adopted in a variety of industries, such as, textile machinery, agricultural machinery, robots, CNC machine tools, medical equipment and sensors.

The demanding of the reliability with respect to the data-processing and the communication system has become higher, as the complexity of the device, the harshness of application environment, and the complexity of the system tasks have been increased. Therefore, it is necessary to improve the communication process of the CAN bus protocol.

DETAILED DESCRIPTION

Figure 1:
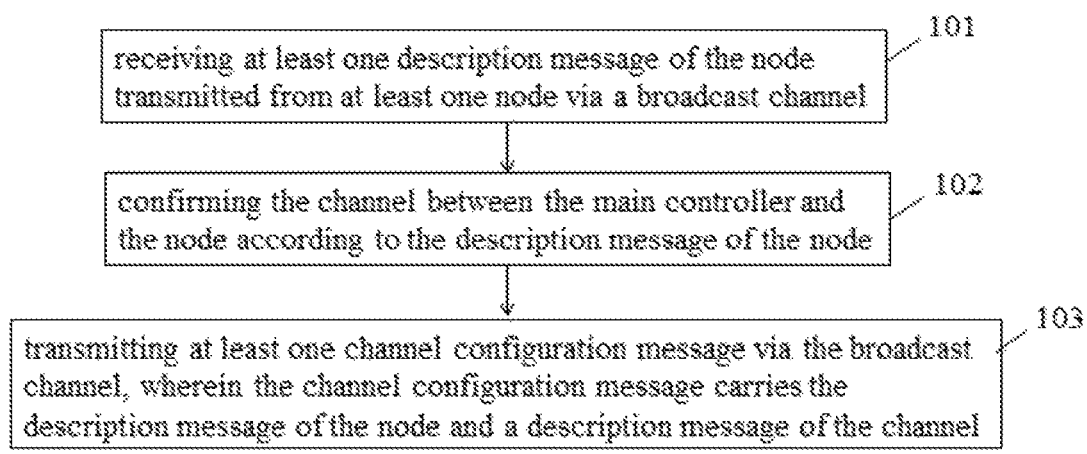
FIG. 1 is a flowchart illustrating a channel configuration method for communication between a main controller of a robot and at least one node of the robot in accordance with one embodiment of the present disclosure.

To clarify the purpose, technical solutions, and the advantages of the disclosure, embodiments of the invention will now be described more fully hereinafter with reference to the accompanying drawings, in which embodiments of the invention are shown. The figure and the embodiment described according to figure are only for illustration, and the present disclosure is not limited to these embodiments.

It should be noted that the relational terms herein, such as "first" and "second", are used only for differentiating one entity or operation, from another entity or operation, which, however do not necessarily require or imply that there should be any real relationship or sequence. Moreover, the terms "comprise", "include" or any other variations thereof are meant to cover non-exclusive including, so that the process, method, article or device comprising a series of elements do not only comprise those elements, but also comprise other elements that are not explicitly listed or also comprise the inherent elements of the process, method, article or device. In the case that there are no more restrictions, an element qualified by the statement "comprises a . . . " does not exclude the presence of additional identical elements in the process, method, article or device that comprises the said element.

A data transmission method and a device in the present disclosure are based on a controller area network (CAN) bus. A main controller in the device is configured to be a control center to control each node within the device. In one embodiment, the main controller is in a robot and nodes are servos of the robot. The main controller may transmit broadcast messages to each of the nodes via a broadcast channel, and may respectively configure a channel for each of the nodes. As such, the main controller may communicate with the respective node via the channel, and the device may achieve a variety of functions under different application scenarios, wherein the nodes may correspond to different elements under the different application scenarios. For example of a robot, the nodes may include joint servo, drive wheel, sensor, and dot matrix display.

The present disclosure relates to a data frame including a standard data frame and an extended data frame, wherein the standard data frame and the extended data frame are configured to improve the conventional standard data frame and the conventional extended data frame within the CAN bus 2.0B.

In the CAN bus 2.0B, the data frame may include a plurality of fields, including a frame start, an arbitration field, a control field, a data field, a cyclic redundancy check (CRC) field, a response field, and a frame end. Wherein the arbitration field may include an identity (ID) sub-field and other flags. The ID sub-field carries the identity of the node, wherein the identity of the node is configured to indicate the different nodes. The main difference between the standard data frame and the extended data frame resides in that the number of bits of the ID sub-field of the arbitration field is different. The number of bits of the ID sub-field of the arbitration field in the standard data frame is 11, and the number of bit of the ID sub-field of the arbitration field in the extended data frame is 29.

The data frame of the present disclosure is configured to improve the ID sub-field and data field of the arbitration field. However, only the enhancement will be described below.

1. The Standard Data Frame in the Present Disclosure.

1.1 the ID Sub-Field of the Arbitration Field.

The difference between the conventional CAN bus 2.0B and the standard data frame in present disclosure is illustrated in Table 1.

In one embodiment, the standard data frame includes a frame-mode indication sub-field and a channel identification field.

The frame-mode indication sub-field includes 2 bits, including M1 and M0, wherein the frame-mode indication sub-field is configured to indicate an analytical method of the frame.

The channel identification field includes 9 bits, including by CH8 to CH0, wherein the channel identification field is configured to indicate the identity of the channel between the main controller and the node. The value of the channel in the standard data frame is in a range from 0 to 511. When the value of the channel identification field is zero, it is determined that the channel is a broadcast channel, wherein each of the nodes may receive messages transmitted from the main controller via the broadcast channel.

TABLE 1

| | ID sub-field (11 bits) | | | | | | | | | | |
|---|---|---|---|---|---|---|---|---|---|---|---|
| CAN bus 2.0B | ID10 | ID9 | ID8 | ID7 | ID6 | ID5 | ID4 | ID3 | ID2 | ID1 | ID0 |
| Examples | M1 | M2 | CH8 | CH7 | CH6 | CH5 | CH4 | CH3 | CH2 | CH1 | CH0 |

The difference between the conventional CAN bus 2.0B and the extended data frame in present disclosure is illustrated in Table 2.

The extended data frame in the present disclosure includes the frame-mode indication sub-field, the channel identification field, and a flag field.

The frame-mode indication sub-field includes 3 bits, including M1, M0, and EM0, wherein the frame-mode indication sub-field is configured to indicate the analytical method of the frame.

The flag field includes 10 bits. N indicates a reserved bit. END is configured to indicate the last frame. For example, if the value of the END equals to zero, it is determined that the frame is not the last frame. If the value of the END equals to 1, the frame is configured to be the last frame. "1" is a self-increasing cycle code configured to indicate a sending serial number of the frame.

The channel identification field includes 16 bits illustrating by CH15 to CH0, wherein the channel identification field is configured to indicate the channel between the main controller and the node. The value of the channel identification field in the extended data frame is in a range from 0 to 65535. The zero value indicates the broadcast channel, wherein each of the nodes may receive messages transmitted from the main controller via the broadcast channel.

TABLE 2

| CAN bus | ID sub-field (29 bits) | | | | | | | | | | |
|---|---|---|---|---|---|---|---|---|---|---|---|
| 2.0B | ID10 | ID9 | ID8 | ID7 | ID6 | ID5 ... | ID0 | EID17 | EID16 | EID15 | ... EID0 |
| Example | M1 | M2 | EM0 | N | END | 17 ... | 12 | 11 | 10 | CH15 | ... CH0 |

An example of the frame-mode indication sub-field of the present disclosure is shown in Table 3. It is note that the different values of the frame-mode indication sub-field may indicate different analytical methods of the frame, wherein the different analytical method are configured to different application scenarios.

TABLE 3

| M1 | M0 | EM0 | Description | Remarks |
|---|---|---|---|---|
| 0 | 0 | 0 | Node controlling instruction frame | Adopting the standard data frame if the identity of the channel corresponding to the node is less than 512, so as |
| 0 | 1 | 0 | Node return instruction frame | |

TABLE 3-continued

| M1 | M0 | EM0 | Description | Remarks |
|---|---|---|---|---|
| 0 | 0 | 1 | Upload node serial number code from the node to the main controller | to improve the efficiency of the bus Adopting the extended data frame to transmit data |

TABLE 3-continued

| M1 | M0 | EM0 | Description | Remarks |
|---|---|---|---|---|
| 0 | 1 | 1 | Configuring the channel code of the node | |
| 1 | 0 | 0 | Block control instruction frame | Adopting the extended data frame to transmit data |
| 1 | 1 | 0 | Block return instruction frame | |
| 1 | 0 | 1 | Block data output frame | |
| 1 | 1 | 1 | Block data input frame | |

1.2 Data Field.

The difference between the conventional CAN bus 2.0B and the data field of the data frame in present disclosure is illustrated in Table 4.

The data field of the data frame in present disclosure may include a CMD field of 1 bit, indicating the different analytical methods of the frame. The CMD field is configured to indicate a secondary instruction, and the different values of the CMD field may represent the different secondary instructions. The CMD field includes 7 bits, from D0 to D6, indicating the data carried by the secondary instruction. The data fields of the block data output frame and the block data input frame respectively include eight bits which are configured to carry the data, so as to improve the transmission efficiency of the block data.

TABLE 4

| | Data field (8 bits) | | | | | | | |
|---|---|---|---|---|---|---|---|---|
| CAN bus 2.0B | D0 | D1 | D2 | D3 | D4 | D5 | D6 | D7 |
| Node controlling instruction frame | CMD | D0 | D1 | D2 | D3 | D4 | D5 | D6 |
| Node return instruction frame | CMD | D0 | D1 | D2 | D3 | D4 | D5 | D6 |

TABLE 4-continued

| | Data field (8 bits) | | | | | | | |
|---|---|---|---|---|---|---|---|---|
| Frame for uploading node serial number code from the Node to the main controller | D0 | D1 | D2 | D3 | D4 | D5 | D6 | D7 |
| Frame for configuring the channel code of the node | D0 | D1 | D2 | D3 | D4 | D5 | D6 | D7 |
| Block control instruction frame | CMD | D0 | D1 | D2 | D3 | D4 | D5 | D6 |
| Block return instruction frame | CMD | D0 | D1 | D2 | D3 | D4 | D5 | D6 |
| Block data output frame | D0 | D1 | D2 | D3 | D4 | D5 | D6 | D7 |
| Block data input frame | D0 | D1 | D2 | D3 | D4 | D5 | D6 | D7 |

In one aspect, as shown in FIG. 1, the present disclosure relates to the channel configuration method for communication between a main controller of a robot and at least one node of the robot. The transmission method may be applied to the main controller, wherein the transmission method may include the following steps.

In step 101: receiving at least one description message of the node transmitted from at least one node via a broadcast channel.

In step 102: confirming the channel between the main controller and the node according to the description message of the node.

In step 103: transmitting at least one channel configuration message via the broadcast channel, wherein the channel configuration message carries the description message of the node and a description message of the channel.

The present disclosure relates to a channel configuration method for communication between the main controller of the robot and the at least one node of the robot configured to confirm the channel according to the description message of the node, so that the main controller may communicate with the node via the channel.

Figure 2:
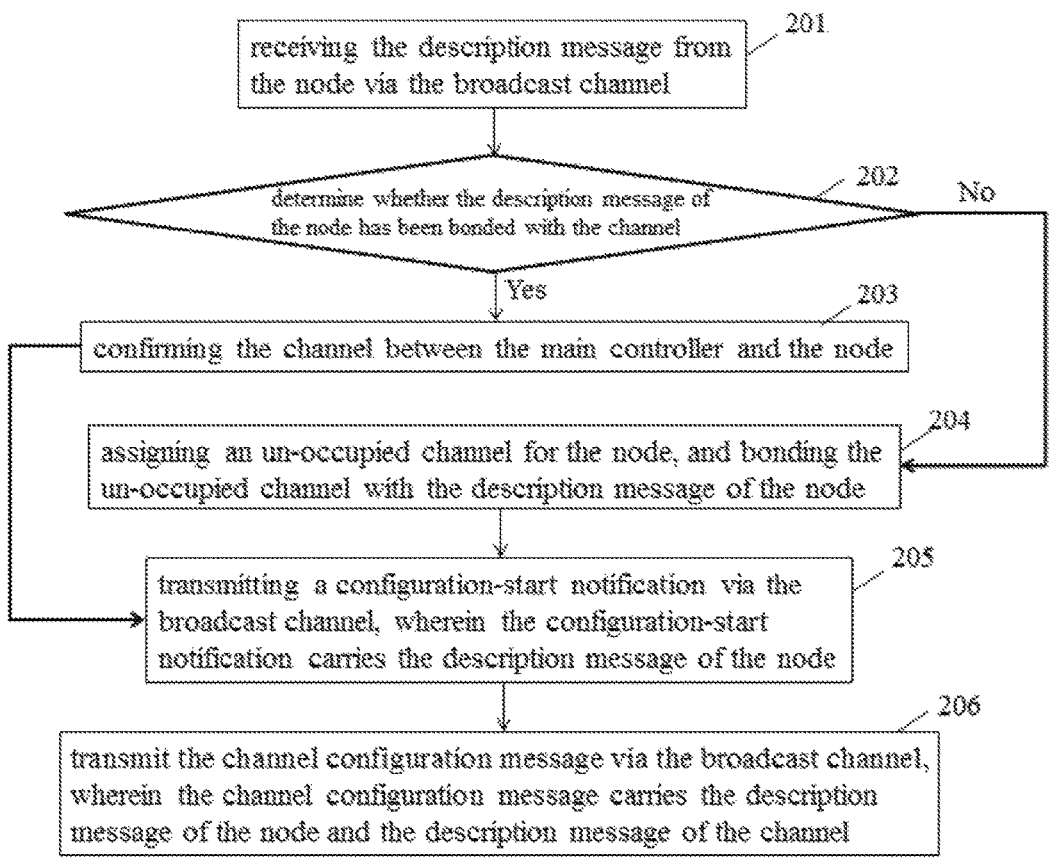
FIG. 2 is a flowchart illustrating a channel configuration method for communication between a main controller of a robot and at least one node of the robot in accordance with one embodiment of the present disclosure.

In another aspect, as shown in FIG. 2, the present disclosure relates to the channel configuration method for communication between the main controller of the robot and the at least one node of the robot. The channel configuration method may be applied on the main controller, wherein channel configuration method may include the following steps.

In step 201: receiving the description message from the node via the broadcast channel.

The description message of the node is transmitted via a frame for uploading node serial number code from the node to the main controller, wherein the frame for uploading node serial number code from the node to the main controller adopts the extended data frame. The ID sub-field of the arbitration field in the frame for uploading node serial number code from the node to the main controller and the format of the data field are illustrated in Table 5.

The description message of the node may include: a product ID (PID), a vender ID (VID), a production date, and a production serial number.

The frame for uploading node serial number code from the node to the main controller includes 8 bits configured to carry the description message of the node.

TABLE 5

| | Field | Description | Range of value | Usage | Remarks |
|---|---|---|---|---|---|
| ID sub-field of the arbitration field | Frame-mode indication sub-field (3 bits) | Frame mode coding of the frame for uploading node serial number code from the node to the main controller | M0 = 0 M1 = 0 EM0 = 1 | Reporting the PID, VID, production date, and the production serial number to the main controller | Invalid broadcast |
| | 1 (8 bits) | Temporary mark | 0~255 | | |
| | Channel identification field (16 bits) | VID | 1~65500, 65501~65534 | 1~65500 is the PID of the node, which is subject to certification; 65501~65534 is the temporary mark, which is not subject to certification | Unsigned number |
| Data field | 0~1 | PID | 1~65500, 65501~65534 | 1~65500 is the PID of the node, which is subject to certification 65501~65534 is the temporary mark, which is not subject to certification | Unsigned number |
| | 2~3 | Production year | 2016~65535 | Indicating the year of the production date | |

TABLE 5-continued

| Field | Description | Range of value | Usage | Remarks |
|---|---|---|---|---|
| 4 | Production month | 1~12 | Indicating the month of the production date | |
| 5 | Production day | 1~31 | Indicating the day of the production date | |
| 6~7 | Production serial number | 0~65535 | The serial number of the node on the production date | |

In step 202: determine whether the description message of the node has been bonded with the channel. The process goes to step 203 upon determining the description message of the node has been bonded with the channel, or the process goes to step 204 upon determining the description message of the node has not been bonded with the channel.

In one example, the node may be offline or may be re-powered after being bonded with the channel, and the node has been configured with the channel, i.e., the description message is bonded with the channel. In another example, the node has not been bonded with the channel. Therefore, the main controller may determine whether the description of the node has been bonded with the channel in the step 202, and may prepare for the following operation.

In step 203: confirming the channel between the main controller and the node, and the process goes to step 205.

In step 204: assigning an un-occupied channel for the node, and bonding the un-occupied channel with the description message of the node.

In step 205: transmitting a configuration-start notification via the broadcast channel, wherein the configuration-start notification carries the description message of the node.

In step 206: transmitting the channel configuration message via the broadcast channel, wherein the channel configuration message carries the description message of the node and the description message of the channel.

The configuration-start notification in the step 205 and the channel configuration message in the step 206 may be transmitted via a frame for configuring the channel code of the node, wherein the frame for configuring the channel code of the node adopts the extended data frame. The ID sub-field of the frame for configuring the channel code of the node and the format of the data field are illustrating in Table 6.

The configuration-start notification in the step 205 may not include a complete message of the frame for configuring the channel code of the node. The configuration-start notification may only include the frame-mode indication sub-field in the ID sub-field of the arbitration field, "I", the channel identification field, the production date of the node, and the production serial number within the data field. The channel configuration message in the step 206 may carry the complete message of the frame for configuring the channel code of the node. Examples will be described combined with the application scenario later in the description.

TABLE 6

| Field | Description | Range of value | Usage | Remarks |
|---|---|---|---|---|
| ID sub-field of arbitration field | Frame-mode indication sub-field (3 bits) | Frame mode coding of the frame for configuring the channel code of the node | M0 = 0<br>M1 = 1<br>EM0 = 1 | Reporting the PID, the VID, the production date, and the production serial number to the main controller | Invalid broadcast |
| | END (1 bit) | Channel: 15 | | The fifteenth bit of the node channel | Unsigned number |
| | 1 (8 bits) | Channel: 0-7 | | The eighteenth bit of the node channel | Unsigned number |
| | Channel identification field (16 bits) | VID | 1~65500, 65501~65534 | 1~65500 is the VID of the node, which is necessary to be certified 65501~65534 is the temporary mark, which is not necessary to be certified | Unsigned number |
| Data field (8 bits) | 0~1 | PID | 1~65500, 65501~65534 | 1~65500 is the VID of the node, which is necessary to be certified 65501~65534 is | Unsigned number |

TABLE 6-continued

| Field | Description | Range of value | Usage | Remarks |
|---|---|---|---|---|
| | | | the temporary mark, which is not necessary to be certified | |
| 2~3 | Production year of the node | 2016~65535 | Indicating the year of the production date | Unsigned number |
| 4: 0-3 | Production month of the node | 1~12 | Indicating the month of the production date | Unsigned number |
| 4: 4-7 | Channel: 8-11 | | The eighth bit to eleventh bit of the node channel | Unsigned number |
| 5: 0-4 | Production day of the node | 1~31 | indicating the day of the production date | Unsigned number |
| 5: 5-7 | Channel: 2-14 | | The twelfth bit to fourteenth bit of the node channel | Unsigned number |
| 6~7 | Production serial number | 0~65535 | The serial number of the node on the production date | Unsigned number |

The channel may be configured by conducting the step 201 to the step 206, wherein the nodes may communicate with the main controller via the channel.

In one example, if the channel is configured after the power of the main controller being turned on, or after the node being reset, or after the power of the node being turned on, the main controller may receive a status message via the configured channel after the step 206. The main controller may transmit an attribute reporting request via the configured channel, receive attribute from the node, and conduct an initialization process on the node according to the attribute.

The status message is configured to indicate a current status of the node, such as normal operations, abnormal operation, function-limited, and function-disorder. The attribute may include a constant portion and a variable portion, wherein the constant portion may further include the PID, an upgrade indicator, and the secondary instruction. The variable portion may further include a node indicator. In one example, the main controller may transmit the attribute reporting request indicates the abnormal operations.

Figure 3:
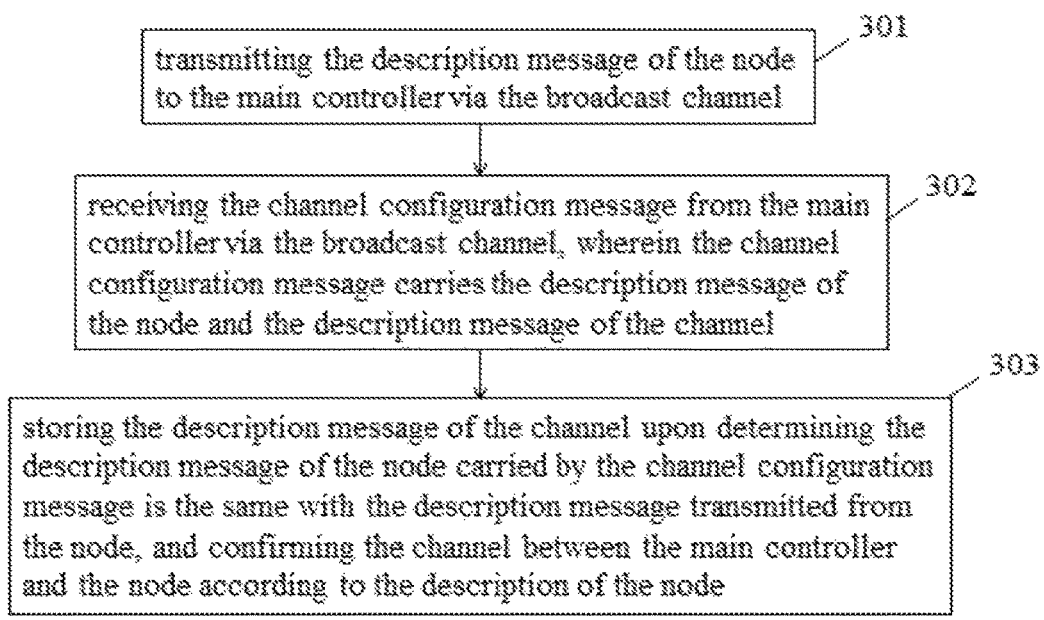
FIG. 3 is a flowchart illustrating a channel configuration method for communication between a main controller of a robot and at least one node of the robot in accordance with one embodiment of the present disclosure.

In one aspect, as shown in FIG. 3, the present disclosure relates to the channel configuration method for communication between the main controller of the robot and the at least one node of the robot. The transmission method may be applied to the node, wherein the transmission method may include the following steps.

In step 301: transmitting the description message of the node to the main controller via the broadcast channel.

In step 302: receiving the channel configuration message from the main controller via the broadcast channel, wherein the channel configuration message carries the description message of the node and the description message of the channel.

In step 303: storing the description message of the channel upon determining the description message of the node carried by the channel configuration message is the same with the description message transmitted from the node, and confirming the channel between the main controller and the node according to the description of the node.

The present disclosure relates to the channel configuration method for communication between the main controller of the robot and the at least one node of the robot, wherein the channel configuration method is configured to confirm the channel according to the description message of the node, so that the main controller may communicate with the node via the channel.

Figure 4:
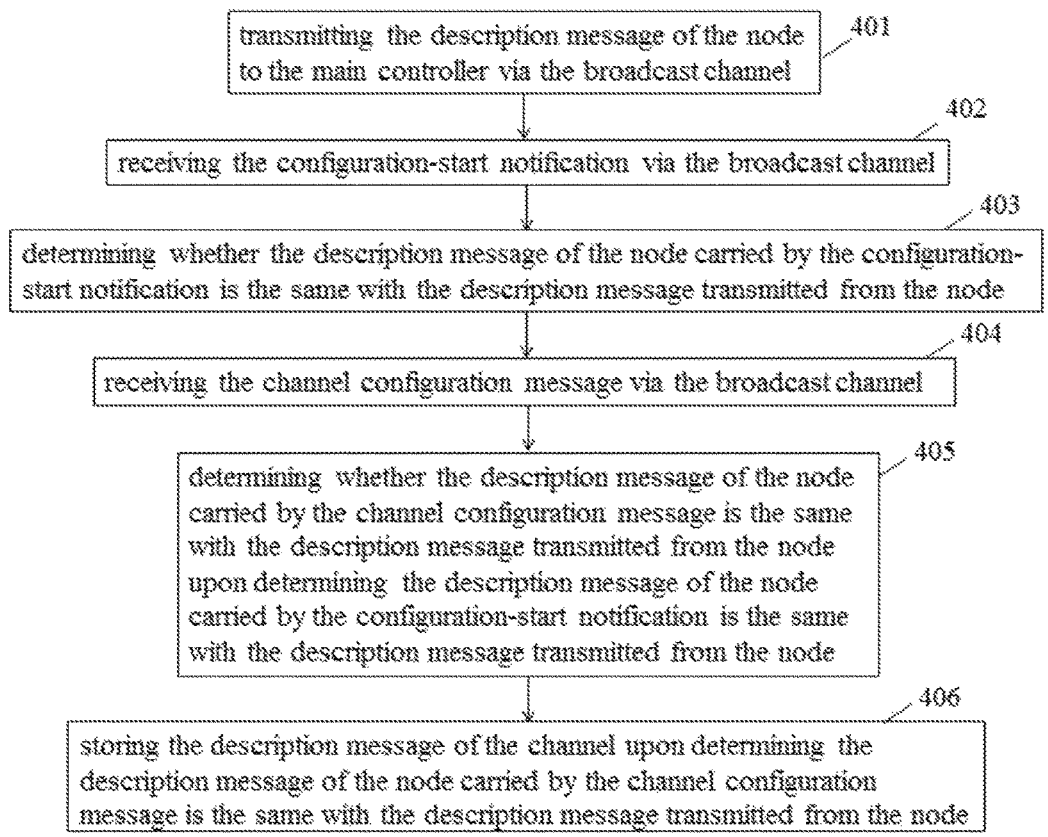
FIG. 4 is a flowchart illustrating a channel configuration method for communication between a main controller of a robot and at least one node of the robot in accordance with one embodiment of the present disclosure

In one aspect, as shown in FIG. 4, the present disclosure relates to the channel configuration method for communication between the main controller of the robot and the at least one node of the robot. The transmission method may be applied to the node, wherein the transmission method may include the following steps.

In step 401: transmitting the description message of the node to the main controller via the broadcast channel.

The description message of the node is transmitted via the frame for uploading node serial number code from the node to the main controller. The frame for uploading node serial number code from the node to the main controller adopts the extended data frame. The above Table 5 illustrates the ID sub-field of the frame for uploading node serial number code from the node to the main controller and the format of the data field.

The node may periodically transmit the upload node serial number code from the node to the main controller according to a predetermined time interval when the node has not received the data transmitted from the main controller over a predetermined time period. For example, the node may transmit the upload node serial number code from the node to the main controller in every one second.

In step 402: receiving the configuration-start notification via the broadcast channel.

The configuration-start notification may be transmitted via the frame for configuring the channel code of the node, wherein the frame for configuring the channel code of the node adopts the extended data frame. Table 6 illustrates the ID sub-field of the frame for configuring the channel code of the node and the format of the data field. The configuration-start notification may only include the frame-mode indication sub-field in the ID sub-field of the arbitration field, "I", the channel identification field, the production date of the node, and the production serial number within the data field, without including the complete messages.

In step 403: determining whether the description message of the node carried by the configuration-start notification is the same with the description message transmitted from the node.

The configuration-start notification is transmitted via the broadcast channel, and thus each of the nodes may receive the configuration-start notification. It is necessary to determine whether the configuration-start notification corresponds to the specific node, which is achieved by the step of determining whether the description message of the node carried by the configuration-start notification is the same with the description message transmitted from the node. The configuration-start notification may be confirmed to be corresponding to the certain node upon determining the configuration-start notification is the same with the description message transmitted from the node.

In step 404: receiving the channel configuration message via the broadcast channel.

The channel configuration message may be transmitted via the frame for configuring the channel code of the node, wherein the frame for configuring the channel code of the node adopts the extended data frame. Table 6 illustrates the ID sub-field of the channel configuration message and the format of the data field. The channel configuration message may carry the complete messages of the frame for configuring the channel code of the node.

In step 405: determining whether the description message of the node carried by the channel configuration message is the same with the description message transmitted from the node upon determining the description message of the node carried by the configuration-start notification is the same with the description message transmitted from the node.

The channel configuration message is transmitted via the broadcast channel. Therefore, it is necessary to determine whether the description message of the channel configuration message is the same with the description message transmitted from the node, so as to confirm that the channel configuration message is corresponding to the certain node. The channel configuration message is confirmed to be with respect to the certain node upon determining the channel configuration message is the same with the description message transmitted from the node.

In step 406: storing the description message of the channel upon determining the description message of the node carried by the channel configuration message is the same with the description message transmitted from the node.

The channel may be configured by conducting the step 401 to the step 406, wherein the node may communicate with the main controller via the channel.

In one example, if the channel is configured after the power of the main controller being turned on, or if the channel is configured after the node being reset, or if the channel is configured after the power of the node being turned on, the node may transmit the status message to the main controller via the configured channel after the step 405. The node may receive the attribute reporting request via the configured channel, and may transmit the attribute to the main controller, so as to drive the main controller to conduct the initialization process according to the attribute.

The status message is configured to indicate a current status of the node, such as normal operations, abnormal operation, function-limited, and function-disorder. The attribute may include a constant portion and a variable portion, wherein the constant portion may further include the PID, an upgrade indicator, and the secondary instruction. The variable portion may further include a node indicator. In one example, the main controller may transmit the attribute reporting request indicates the abnormal operations.

The following description is an example of the present disclosure applied to an application scenario.

The description message is assumed to be: PID=1, VID=2, the production date is 18/4/16, and the production serial number is 100. The description message of the channel may include the channel indicator which is configured to be 5.

1. The main controller receives the upload node serial number code from the node to the main controller transmitted from the node, and the value of each field is as follow. M0M1EM0=001, I=0, channel=2, data[0]data[1]=1, data[2]data[3]=2016, data[4]=4, data[5]=18, data[6]data[7]=100.

2. The main controller transmits the frame for configuring the channel code of the node via the broadcast channel, wherein the frame for configuring the channel code of the node is configured to be as the configuration-start notification. The value of each field is as follow. M0M1EM0=011, 1=5, channel=2, data[2]data[3]=2016, data[4]=4, data[5]=18, data[6]data[7]=100.

3. The main controller transmits the frame for configuring the channel code of the node via the broadcast channel, wherein the frame for configuring the channel code of the node is configured to be as the channel configuration message. The value of the each field is as follow. M0M1EM0=011, end=0, I=5, channel=2, data[0]data[1]=1, data[2]data[3]=2016, data[4]: 0-3=4, data[4]: 4-7=0, data[5]: 0- 4=18, data[5]: 5-7=0, data[6]data[7]=100.

4. The node determines whether the description message of the node channel configuration message is the same with the description message transmitted from the node. The node stores the channel indicator of the node channel configuration message upon determining the description message of the node channel configuration message is the same with the description message transmitted from the node.

As such, the main controller configures five channels for the nodes, wherein the node may communicate with the main controller via the channel.

The present disclosure further relates to a channel configuration device for controlling robots. The description of the frame format is same with the above, and may not be described again.

Figure 5:
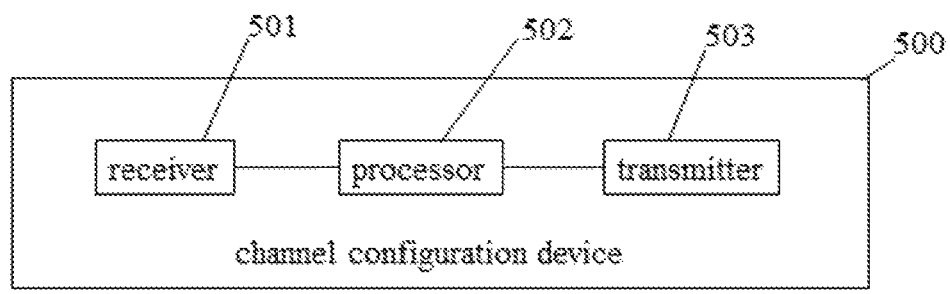
FIG. 5 is a schematic view of a device for controlling robots in accordance with one embodiment of the present disclosure.

The channel configuration device 500, as shown in FIG. 5, may be applied to the main controller, and may include a receiver 501, a processor 502, and a transmitter 503.

Wherein the receiver 501 is configured to receive the description message of the node via the broadcast channel. The processor 502 is configured to confirm the channel according to the description message of the node, and the main controller may communicate with the node via the channel. The transmitter 503 is configured to transmit the channel configuration message via the broadcast channel, and the channel configuration message carries the description message of the node and the description message of the channel.

The present disclosure relates to the channel configuration method for communication between the main controller of the robot and the at least one node of the robot, wherein the channel configuration method is configured to confirm the channel according to the description message of the node, so that the main controller may communicate with the node via the channel In one example, the processor 502 is further configured to: determine whether the description message of the node has been bonded with the channel, configure the bonded channel as the channel communicating with the node upon determining the description message of the node is bonded with the channel, assign the un-occupied channel to the node, and bonding the un-occupied channel with the description message of the node upon determining the description message of the node is not bonded with the channel.

In one example, the transmitter 503 is further configured to: transmit the configuration-start notification via the broadcast channel, wherein the configuration-start notification carries the description message of the node, transmit the channel configuration message via the broadcast channel, wherein the channel configuration message carries the description message of the node and the description message of the channel.

In another example, the transmitter 503 is further configured to transmit the attribute reporting request via the channel between the main controller and the node. The receiver 501 is further configured to receive attribute reported from the node. The processor 502 is further configured to conduct the initialization process on the node according to the attribute.

The receiver 501 is further configured to receive the status message of the node via the channel between the main controller and the node before transmitting the attribute reporting request.

Figure 6:
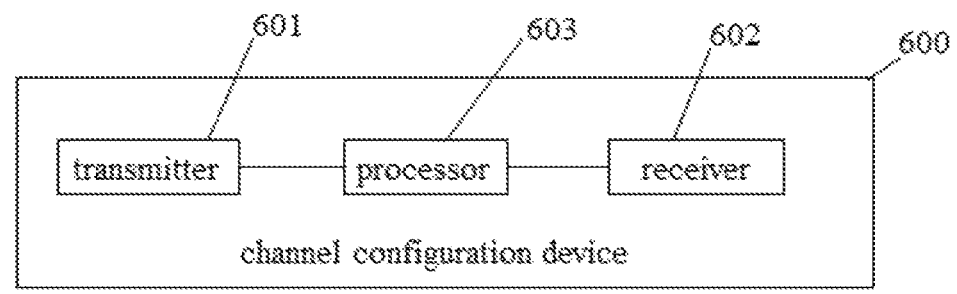
FIG. 6 is a schematic view of a device for controlling robots in accordance with one embodiment of the present disclosure

As shown in FIG. 6, the present disclosure relates to the channel configuration device 600. The channel configuration device 600 may be applied to the node, and may include the receiver 601, the processor 602, and the transmitter 603.

Wherein the transmitter 601 is configured to transmit the description message of the node via the broadcast channel. The receiver 602 is configured receive the channel configuration message via the broadcast channel, wherein the channel configuration message carries the description message of the node and the description message of the channel. The processor 503, and memory storage is configured to store the description message of the channel upon the processor determining the description message of the node carried by the channel configuration message is the same with the transmitting description message of the node.

The channel between the main controller and the node is confirmed according to the description message of the node.

The present disclosure relates to the channel configuration method for communication between the main controller of the robot and the at least one node of the robot, wherein the channel configuration method is configured to confirm the channel according to the description message of the node, so that the main controller may communicate with the node via the channel In one example, the receiver 602 may be further configured to: receive configuration-start notification via the broadcast channel, receive the channel configuration message via the broadcast channel. The processor 603 may be further configured to: determine whether the description message of the node carried by the configuration-start notification is the same with the description message transmitted from the node, determine whether the description message of the node carried by the channel configuration message is the same with the description message transmitted from the node upon determining the description message of the node carried by the configuration-start notification is the same with the description message transmitted from the node.

In one example, the transmitter 601 is further configured to periodically transmit the description message of the node via the broadcast channel according to the predetermined time interval upon determining the node has not received the data transmitted form the main controller over the predetermined time period.

In another example, the receiver 602 is further configured to receive the attribute reporting request via the channel, wherein the node may communicate with the main controller via the channel. The transmitter 601 is further configured to report attribute of the node to the main controller.

The transmitter 601 is further configured to report the status message of the node via the channel before receiving the attribute reporting request, wherein the node may communicate with the main controller via the channel.

The above description is merely the embodiments in the present disclosure, the claim is not limited to the description thereby. The equivalent structure or changing of the process of the content of the description and the figures, or to implement to other technical field directly or indirectly should be included in the claim.

What is claimed is:

1. A channel configuration method for communication between a main controller of a robot and at least one node of the robot, comprising:
   receiving, by the main controller, a serial number of the at least one node via a broadcast channel;
   determining, by the main controller, a channel bonded with the at least one node as the channel for communicating with the node based on the serial number, wherein the main controller communicates with the node via the channel;
   transmitting, by the main controller, at least one channel configuration message via the broadcast channel for configuring the channel for communicating with the node, wherein the channel configuration message carries the serial number of the node and a description message of the channel.

2. The channel configuration method for communication between the main controller of the robot and the at least one node of the robot according to claim 1, wherein the determining step further comprises:
   assigning, by the main controller, an un-occupied channel to the node, and bonding the un-occupied channel with the the node upon determining the node is not bonded with the channel.

3. The channel configuration method for communication between the main controller of the robot and the at least one node of the robot according to claim 2, wherein the transmitting step further comprises:
   transmitting, by the main controller, a configuration-start notification via the broadcast channel for configuring the channel for communicating with the node, wherein the configuration-start notification carries a description message of the node comprising the serial number;
   transmitting, by the main controller, the channel configuration message via the broadcast channel for configuring the channel for communicating with the node, wherein the channel configuration message carries the description message of the node and the description message of the channel;
wherein the configuration-start notification further comprises:
   a frame-mode indication sub-field configured to indicate a frame analytical method;
   a channel identification field configured to indicate the channel between the main controller and the node; and
   a flag field.

4. The channel configuration method for communication between the main controller of the robot and the at least one node of the robot according to claim 3, wherein the method further comprises:

transmitting at least one attribute reporting request via the channel, wherein the main controller communicates with the node via the channel;
receiving at least one attribute reported from the node;
conducting an initialization process on the node according to the attribute;
wherein the attribute comprises:
a constant portion configured with a product identity (PID), an upgrade indicator, and a secondary instruction.

5. The channel configuration method liar communication between the main controller of the robot and the at least one node of the robot according to claim 3, wherein the description message of the node further comprises at least one of a product ID, a vender ID, and a production date, and the description message of the channel comprises a channel indicator.

6. The channel configuration method for communication between the main controller of the robot and the at least one node of the robot according to claim 4, wherein the channel configuration method further comprises:
receiving a status message of the node via the channel before transmitting the attribute reporting request, wherein the main controller communicate with the node via the channel.

7. A channel configuration device for a main controller of a robot, comprising:
a receiver configured to receive a serial number of at least one node of the robot via a broadcast channel;
a processor configured to determine a channel bonded with the at least one node as the channel for communicating with the node based on the serial number, wherein the main controller communicates with the node via the channel;
a transmitter configured to transmit at least one channel configuration message via the broadcast channel for configuring the channel for communicating with the node, wherein the channel configuration message carries the serial number of the node and a description message of the channel.

8. The channel configuration device for controlling robots according to claim 7, wherein the processor is further configured to:
assign, by the main controller, an un-occupied channel to the node, and bonding the un-occupied channel with the the node upon determining of the node is not bonded with the channel.

9. The channel configuration device for controlling robots according to claim 8, wherein the transmitter is further configured to:
transmit a configuration-start notification via the broadcast channel for configuring the channel for communicating with the node, wherein the configuration-start notification carries a description message of the node comprising the serial number;
transmit the channel configuration message via the broadcast channel, wherein the channel configuration message carries the description message of the node and the description message of the channel;
wherein the configuration-start notification further comprises:
a frame-mode indication sub-field configured to indicate a frame analytical method;
a channel identification field configured to indicate the channel between the main controller and the node; and
a flag field.

10. The channel configuration device for controlling robots according to claim 9, wherein the transmitter is .further configured to transmit at least one attribute reporting request via the channel, wherein the main controller communicates with the node via the channel;
the receiver is further configured to receive at least one attribute reported from the node;
the processor is further configured to conduct an initialization process on the node according to the attribute;
the attribute comprises:
a constant portion configured with a PID, an upgrade indicator, and a secondary instruction.

11. The channel configuration device for controlling, robots according to claim 9, wherein the description message of the node further comprises at least one of a product ID, a vender ID, and a production date, and the description message of the channel comprises a channel indicator.

12. The channel configuration device for controlling robots according to claim 10, wherein the receiver is further configured to receive a status message of the node via the channel, before transmitting the attribute reporting request, wherein the main controller communicate with the node via the channel.

13. A channel configuration device for a node of a robot, comprising:
a transmitter configured to transmit a serial number of the node via a broadcast channel;
a receiver configured receive at least one channel configuration message via the broadcast channel, wherein the channel configuration message carries the serial number of the node and a description message of the channel;
a processor; and
memory storage configured to:
store the description message of the channel upon the processor determining the serial number of the node carried by the channel configuration message is the same with the transmitting serial number of the node;
confirm a channel according to the serial number of the node, wherein a main controller of the robot communicates with the node via the channel.

14. The channel configuration device for controlling robots according to claim 13, wherein the receiver is further configured to:
receive a configuration-start notification via the broadcast channel for configuring the channel for communicating with the node;
receive the channel configuration message via the broadcast channel;
the processor is further configured to:
determine whether a serial number of the node carried by the configuration-start notification is the same with transmitting serial number;
determine whether the serial number of the node carried by the channel configuration message is the same with the transmitting serial number of the node, upon determining the serial number of the node carried by the configuration-start notification is the same with the transmitting serial number;
wherein the configuration-start notification further comprises:
a frame-mode indication sub-field configured to indicate a frame analytical method;
a channel identification field configured to indicate the channel between the main controller and the node; and
a flag field.

15. The channel configuration device for controlling robots according to claim 13, wherein the transmitter is further configured to periodically transmitting the serial number of the node via the broadcast channel according to a predetermined time interval upon determining data transmitted form the main controller has not been received over a predetermined time period.

16. The channel configuration device for controlling robots according to claim 13, wherein the receiver is further configured to receive at least one attribute reporting request via the channel, wherein the node communicate with the main controller via the channel;

the transmitter is further configured to report attribute of the node;

the attribute comprises:

a constant portion configured with a PID, an upgrade indicator, and a secondary instruction.

17. The channel configuration device fur controlling robots according to claim 16, wherein the transmitter is further configured to report a status message of the node via the channel before receiving the attribute reporting request, wherein the node communicate with the main controller via the channel.

18. The channel configuration device for controlling robots according to claim 13, wherein the description message of the channel comprises a channel indicator.

* * * * *